(12) United States Patent
Boberski

(10) Patent No.: US 11,593,882 B2
(45) Date of Patent: *Feb. 28, 2023

(54) CREDIT DEFAULT SWAP CLEARING

(71) Applicant: Chicago Mercantile Exchange Inc., Chicago, IL (US)

(72) Inventor: David Andrew Boberski, Westport, CT (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,155

(22) Filed: Jan. 11, 2022

(65) Prior Publication Data

US 2022/0138850 A1    May 5, 2022

Related U.S. Application Data

(63) Continuation of application No. 16/284,444, filed on Feb. 25, 2019, now Pat. No. 11,257,154, which is a continuation of application No. 12/559,937, filed on Sep. 15, 2009, now Pat. No. 10,248,997.

(51) Int. Cl.
*G06Q 40/00* (2012.01)
*G06Q 40/04* (2012.01)

(52) U.S. Cl.
CPC .................... *G06Q 40/04* (2013.01)

(58) Field of Classification Search
CPC ................ G06Q 40/04; G06Q 40/00
See application file for complete search history.

(56) References Cited

U.S. PATENT DOCUMENTS

| 2002/0019799 | A1   | 2/2002  | Ginsberg    |               |
|--------------|------|---------|-------------|---------------|
| 2004/0220870 | A1 * | 11/2004 | Lundberg    | G06Q 40/04    |
|              |      |         |             | 705/37        |
| 2005/0086152 | A1   | 4/2005  | Sweeting    |               |
| 2005/0108128 | A1   | 5/2005  | Kastel      |               |
| 2006/0129472 | A1 * | 6/2006  | Harrington  | G06Q 40/00    |
|              |      |         |             | 705/35        |

(Continued)

OTHER PUBLICATIONS

Federal Reserve (Brady Bonds and Other Emerging-Markets Bonds, Trading and Capital-Markets Activities Manual https://www.federalreserve.gov/boarddocs/supmanual/trading/4000p2.pdf 1998) (Year: 1998).*

(Continued)

*Primary Examiner* — Mike Anderson
*Assistant Examiner* — Mark H Gaw
(74) *Attorney, Agent, or Firm* — Lempia Summerfield Katz LLC

(57) ABSTRACT

An electronic trading system is configured to trade credit default swap (CDS) futures contracts on an open exchange. The CDS futures contract allows the buyer and seller isolate and trade the credit risk of a third party. The third pay may be a corporation, sovereign government, or any entity that issues bonds or notes. The CDS futures contract seller effectively pays the premium over time in increments determined by market rates and through the natural operation of the open market. The CDS futures contract buyer makes a contingency payment if the CDS futures contract goes in-the-money (ITM). Both sides of the contract are guaranteed by the exchange as a counterparty.

26 Claims, 7 Drawing Sheets

(56) References Cited

U.S. PATENT DOCUMENTS

| | | |
|---|---|---|
| 2006/0224494 A1 | 10/2006 | Pinkava |
| 2006/0253361 A1* | 11/2006 | Robinson ............... G06Q 40/06 705/35 |
| 2006/0282355 A1* | 12/2006 | Canezin ................ G06Q 40/00 705/35 |
| 2007/0083447 A1 | 4/2007 | Corcoran et al. |
| 2007/0198396 A1 | 8/2007 | Dinc |
| 2008/0082437 A1 | 4/2008 | Co et al. |
| 2008/0183613 A1 | 7/2008 | Frankel |
| 2008/0195519 A1 | 8/2008 | Stevens |
| 2008/0215430 A1 | 9/2008 | Ellis |

OTHER PUBLICATIONS

Bank for International Settlements (Credit risk transfer, ISBN 92-9131-641-5, https://www.bis.org/publ/cgfs20.pdf, Jan. 2003) (Year: 2003).*

Bank for International Settlements (Credit risk transfer, ISBN 92-9131-641-5, https://www.bis.org/publ/cgfs2o.pdf, Jan. 2003) (Year:2003).

Heijmans, Pamela (Credit Default Swaps, Princeton University, https://www.princeton.edu/-nnarkus/teaching/Eco467/10Lecture/CDS%20Presentation%20with%20References.pdf, Oct. 21, 2013) (Year: 2013).

International Search Report and Written Opinion in International Application No. PCT/US10/47940, dated Oct. 28, 2010, 5 pages.

OECD (Zero-Coupon / Deep Discount Bond, Financial Terminology Database, Bank of England, https://stats.oecd.org/glossary/detail.asp?I D=2958, Sep. 2001) (Year: 2001).

\* cited by examiner

CREDIT DEFAULT SWAP CLEARING

REFERENCE TO RELATED APPLICATIONS

This application is a continuation under 37 C.F.R. § 1.53(b) of U.S. patent application Ser. No. 16/284,444 filed Feb. 25, 2019 now U.S. patent application Ser. No. 11/257,154, which is a continuation under 37 C.F.R. § 1.53(b) of U.S. patent application Ser. No. 12/559,937 filed Sep. 15, 2009, now U.S. Pat. No. 10,248,997, the entire disclosure of which are hereby incorporated by reference.

TECHNICAL FIELD

The present invention relates to software, systems and methods for electronic trading in a commodities exchange, derivatives exchange or similar business involving tradable items where orders from buyers are matched with orders from sellers.

BACKGROUND

A swap contract is a derivative in which two counterparties agree to exchange one stream of cash flows for another stream of cash flows. A credit default swap (CDS) is a swap contract in which one leg is a series of payments and the other leg is a one time lump payment if, for example, an ISDA defined credit event occurs. FIG. 1 illustrates that the credit default swap buyer 20 makes a series of payments to the credit default swap seller 10. In the event of a credit event, the series of payments will cease and the credit default swap seller 10 makes a lump payment to the credit default swap buyer 20. FIG. 2 further illustrates the cash flows between credit default swap seller 10 and the credit default swap buyer 20.

An exemplary credit event is said to occur when a credit instrument goes into default. Credit default swaps behave in a manner similar to insurance. The buyer of the CDS makes a series of payments as the buyer of an insurance policy make a series of premium payments. The seller of a CDS make a large payoff if a relatively unlikely event occurs in the same way that an insurance company pays the insured in the event of a flood, fire, or car accident. CDS differ from insurance policies because neither the buyer nor seller in the CDS contract needs to be associated with the underlying instrument.

Even though credit default swaps were introduced only in the mid-1990's, the market has grown at an extraordinary pace. The notional value of the CDS market is estimated at $55 trillion, which exceeds the U.S. Stock Market, U.S. treasuries market, and mortgage market combined.

In spite of the size of the CDS market, the current infrastructure cannot support tracking the performance of a CDS contract. For this reason, the CDS market is not transparent to the public. Consequently, many have criticized the CDS market, pointing to a lack of regulation and transparency.

Additionally, the CDS market operates on an over the counter (OTC) basis. An OTC is a bilateral agreement between two parties. An OTC involves counterparty risk because the other party of the bilateral agreement may default on the CDS contract.

A "clearinghouse" or "exchange" greatly reduces counterparty risk by acting as a counterparty to every trade. One example of an exchange is the Chicago Mercantile Exchange Inc. (CME), which provides a marketplace where derivatives are traded and cleared. A CDS contract involves a series of payments, which cannot be supported by existing industry infrastructures.

As governments around the world are absorbing the riskiest corporate balance sheets, sovereign credit is assuming many of the characteristics of corporate debt purchased by governments. There was a time when the market believed that interest rates, energy, and agricultural price risks didn't need to be hedged. The "great awakening" to sovereign risk parallels the realization in markets where hedging is now considered common place.

What is needed is a system and method capable of trading a derivative that will be behave in a similar fashion to a credit default swap while still adhering to futures pricing conventions and legacy infrastructure.

DETAILED DESCRIPTION OF THE DRAWINGS AND PRESENTLY PREFERRED EMBODIMENTS

Credit default swap futures contracts are pay-as-you-go options. The buyer and seller isolate and trade the credit risk of a third party, known as a reference entity. The option buyer pays the premium over time, while the seller has no responsibility unless the option goes in-the-money (ITM), at which point a contingency payment is owed to the option buyer from the option seller. The option will either go in-the-money or expire worthless.

A difference between CDS and a traditional option is that the "trigger" for the option going in-the-money is not a market movement referencing the price of a stock, bond, or commodity. A market movement is the trigger that puts traditional options on stocks or futures in-the-money. CDS futures go in-the-money upon the occurrence of a credit event.

The reference entity may be a corporation or a sovereign that usually has debt outstanding. Outstanding debt is a requirement for the reference entity, since CDS references the price of a defaulted note if there is a credit event. The outstanding debt is often a corporate bond or a government bond. In exchange for the contingency payment, the option buyer may be required to make physical delivery of a bond or note issued by the reference entity. Alternatively, the CDS futures contract may be cash settled to a third party reference price.

The International Swaps and Derivatives Association, Inc. (ISDA) lists the following credit events: (1) bankruptcy, (2) obligation acceleration, (3) obligation default, (4) failure to pay, (5) repudiation/moratorium, and (6) restructuring. This list could be altered without changing the principle operation of the CDS. Further, it should be noted that the possible credit events may be different for a sovereign than a corporate entity.

Bankruptcy generally refers to the events associated with insolvency proceedings, but may be wider in scope to include even any action taken by the reference entity in furtherance of a bankruptcy. For example, a board meeting that considered filing a liquidation petition. An obligation acceleration is when the obligation comes due because of a default by the reference entity. An obligation default occurs when the reference obligation is capable of being declared due. A repudiation or moratorium is when the reference entity disaffirms, disclaims, or challenges the validity of the obligation. Restructuring may include a reduction in the principal amount or interest payable under the obligation, a postponement of payment, or a change in ranking of payment.

A CDS derivative that can be traded on a futures and commodities exchange would reduce the prevailing counterparty risk. However, the legacy exchange infrastructures do not support the pay as you go nature of CDS. The conditional nature cannot be supported by the accrual of a fixed coupon.

Figure 1:
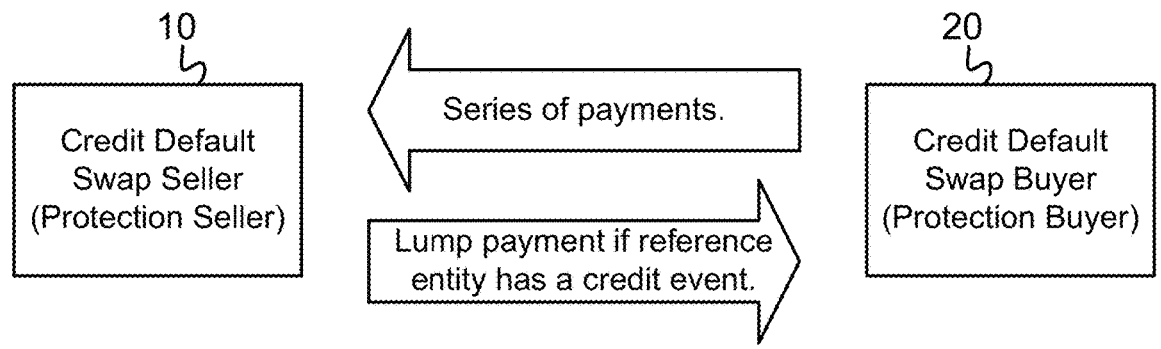
FIG. 1 illustrates an OTC credit default swap.
Figure 2:
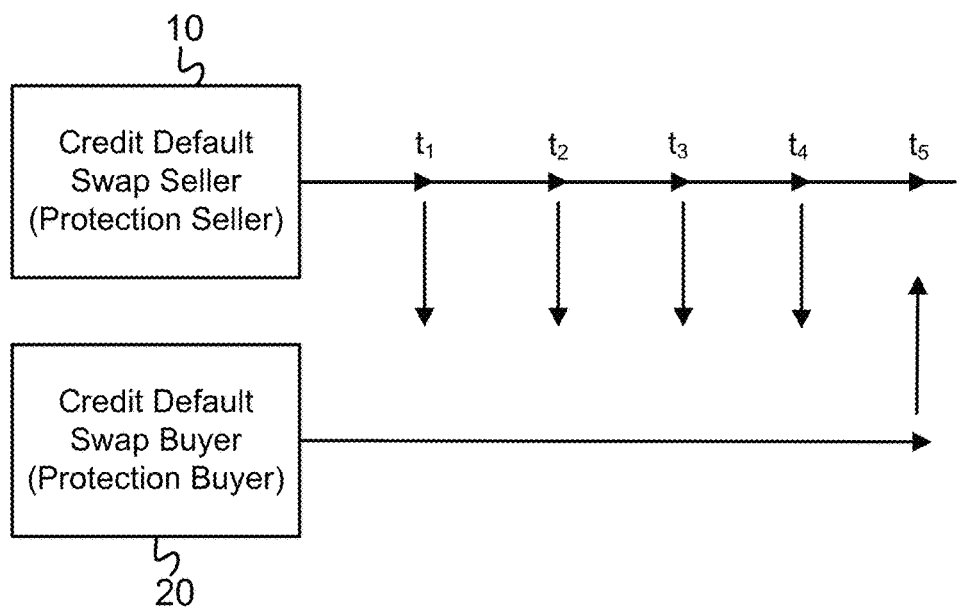
FIG. 2 illustrates cash flows for an OTC credit default swap.
Figure 3:
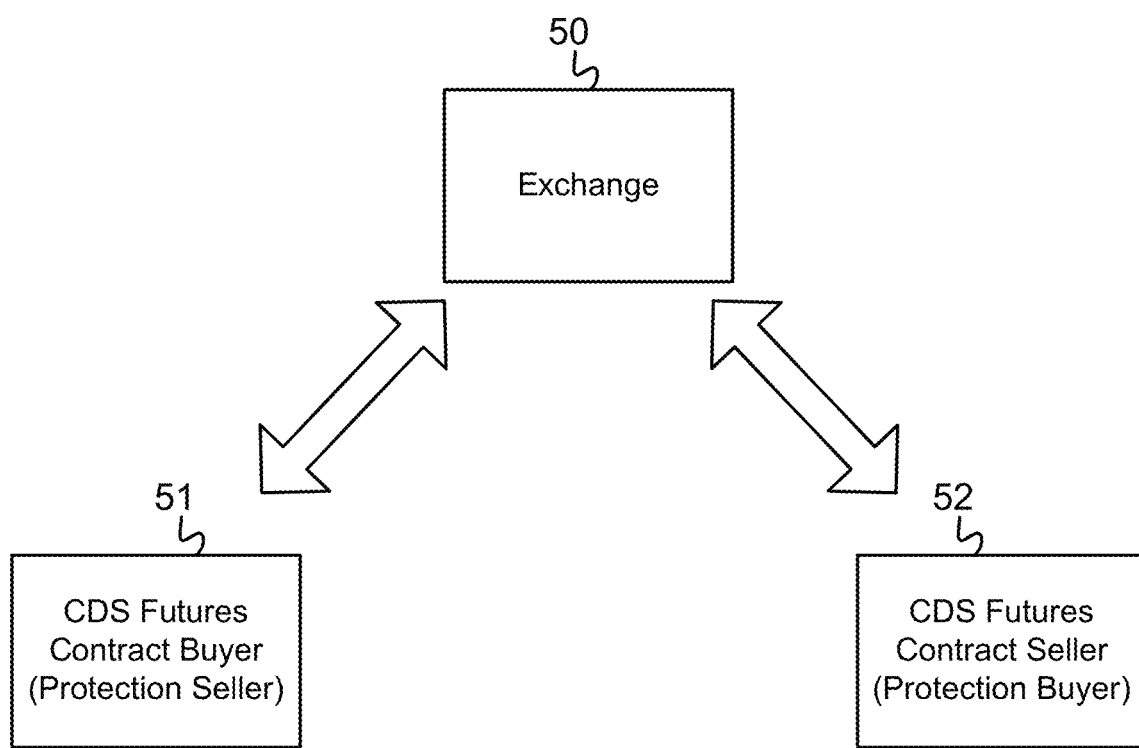
FIG. 3 illustrates an exchange and a CDS futures contract.

FIG. 3 illustrates an exchange capable of trading a CDS futures contract. The buyer of protection is the seller of the CDS futures contract, and the seller of protection is the buyer of the CDS futures contract. The exchange 50 becomes the counterparty to both entities in a credit default swap. The protection buyer 52 is the CDS futures contract seller, and the protection seller 51 is the CDS futures contract buyer. The buyer of the CDS futures contract assumes a long at the price of the contract. The seller of the CDS futures contract assumes a short at the price of the contract. The price is quoted on an annual basis, in basis points.

The exchange guarantees, when there is no credit event, that the protection seller 51 will receive the premium every day until expiration of the futures contract. The exchange guarantees, when there is a credit event, that the protection buyer 51 will receive the contingency payment. The protection buyer 51 may be required to provide a bond or note issued by the reference entity in exchange for the contingency payment. The bond or note may be required to have a maturity within a particular range.

The buyer of the futures contract receives the option premium over time, and is equivalent to the seller of protection in the OTC market. The futures contract is priced as a base value less the cumulative annual premium. For example, a CDS with a notional value of $1 million may be priced at 100 less the total premium due for the life of the instrument. If the annual premium were 100 basis points, then the price of a 5-year futures contract would be 95.00 points, which translates to $950,000 in this example. Six months later, the price would be 95.50, if there were no other changes in the market. By construction a 5-year contract would have a dollar value of one (01) basis point (DV01) equal to $500. If there is a credit event, the buyer of the contract is obligated to pay $1 million to the seller of the contract. In one implementation, the seller of the contract may be required to deliver $1 million face value of a note of any maturity from the reference entity before the buyer of the contract is required to make the $1 million payment to the seller of the contract.

The amount of money that changes hands from the seller of the futures contract to the buyer of the futures contract corresponds to the series of payments in the OTC CDS. For example, 100 basis points means one quarter of one percent or 0.25% of the notional is transferred quarterly. The market will naturally cause the price of the futures contract to increase over time as the amount of time remaining for a credit event to occur decreases. Assuming, no change in the market's perception of the risk attached to the reference entity, the price of the 5-year futures contract will slowly increase from the 95.00 initial price to 100.00 at expiration. At that point, the position of the seller of the futures contract (buyer of protection) will have gained 500 basis points and the position of the buyer of the futures contract (seller of protection) will have lost 500 basis points.

Figure 4:
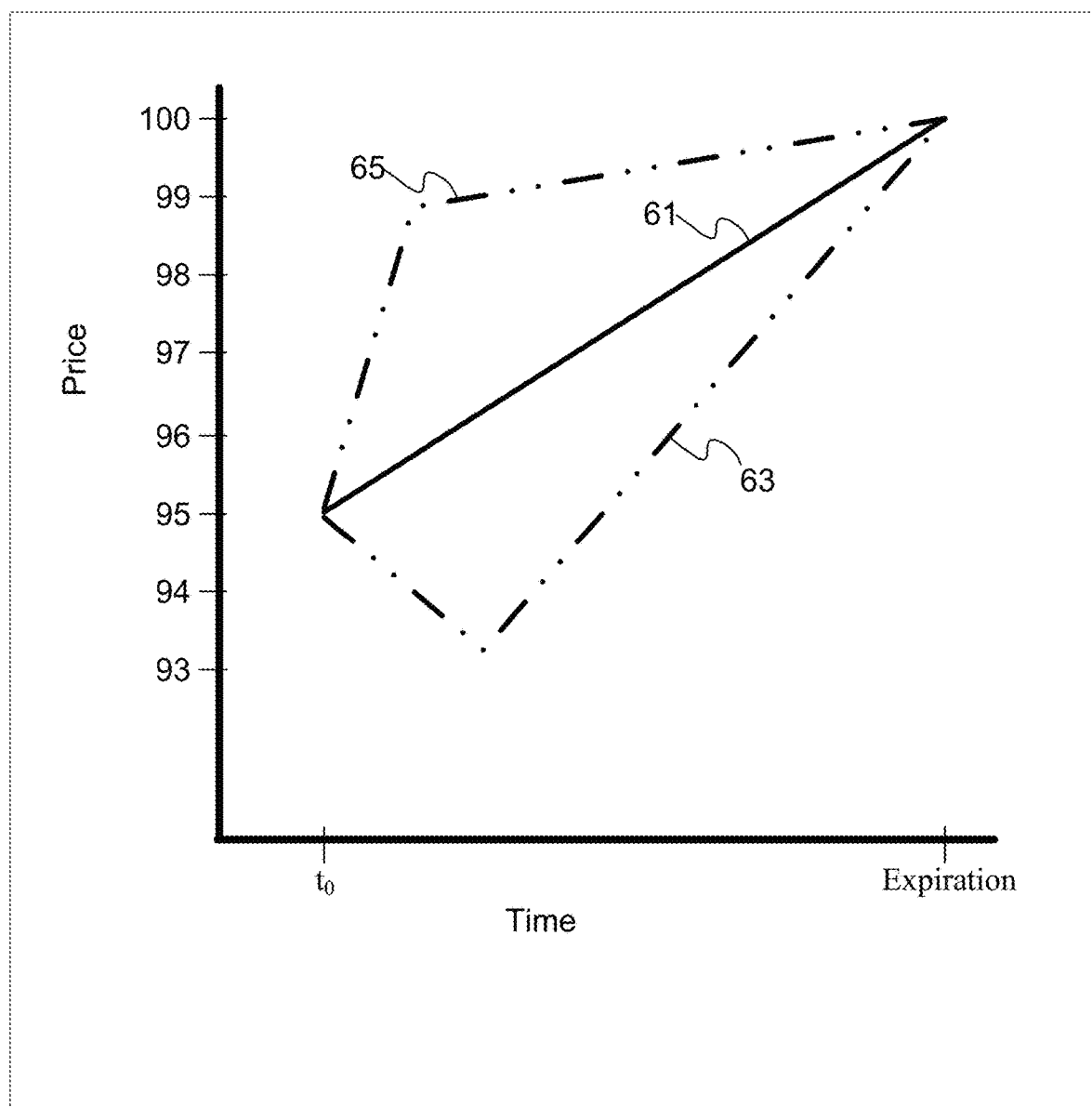
FIG. 4 is a graph of hypothetical CDS futures contracts.

FIG. 4 illustrates the behavior a credit default swap futures contract. The initial price at $t_0$ is 95 and the final price at expiration at the end of five years is 100.

The example shown by line 61 assumes no change in risk. That is, the market does not perceive any change in the riskiness of the reference entity from the beginning of the CDS contract at $t_0$ until the expiration of the CDS contract. The price of the futures contract increases linearly with the passage of time through daily mark to market accruals. The mark to market accruals will be a gain to the buyer of the futures contract (long position in the CDS futures contract) and a loss to the seller of the futures contract (short position in the CDS futures contract). Mark to market is the system by which the exchange pays or collects from each trader based on the activities of the previous day (or other time period). The cumulative premium will effectively be prorated (and accrued) over 360 or 252 days (or some other number days per year) over the lifetime of the instrument.

The price of the CDS futures contract is completely driven by the market. The example shown by line 61 above assumes that the risk attached to the reference entity has not changed. However, if the market perceives a change in the reference entity's risk, the price will change.

If the market perceives that the reference entity becomes more risky, there is greater chance of a credit event and greater chance the seller of protection will have to pay the notional amount. Accordingly, the price of the futures contract will decrease. An example where the market perceives more risk associated with the reference entity for a time period is shown by line 63. However, the price of the CDS futures contract at expiration must return to the final price of 100, unless there is a credit event.

Likewise, if the market perceives that the reference entity becomes less risky, there is less of a chance of a credit event and less chance that the seller of protection will have to pay the notional amount. Accordingly, the price of the futures contract will increase because the cumulative annual premium has decreased. An example where the market perceives less risk associated with the reference entity for a time period is shown by line 65. However, the price of the CDS futures contract at expiration must return to the final price of 100.

Figure 5:
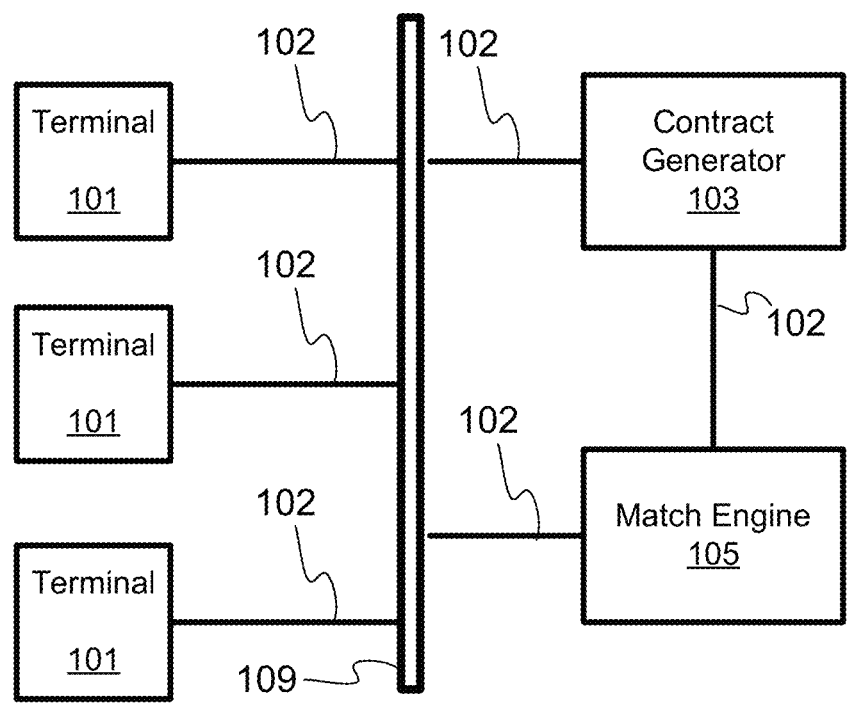
FIG. 5 illustrates an electronic trading system.

FIG. 5 illustrates an electronic trading system including a plurality of terminals 101, communication links 102, bus 109, a contract generator 103, and a match engine 105. The contract generator 103 and match engine 105 are coupled with each other as well as terminals 101. As used herein, the phrase "coupled with" is defined to mean directly connected to or indirectly connected through one or more intermediate components. Such intermediate components may include both hardware and software based components.

The communication link 102 connects the terminals 101, contract generator 103, and match engine 105 over any sized geographical area. In one embodiment, the communication link 102 includes a network such as a local area network ("LAN"), a wide area network ("WAN"), a metropolitan area network, a virtual area network, a wireless local network, a local bus, a direct or indirect satellite network, or combinations thereof. Further, the communications link 102 may include a publicly accessible network such as the Internet, a privately accessible network such as an Intranet, or a combination of privately and publicly accessible networks. In one embodiment, the communication link 102 includes a data conversion device, such as a modem, that converts data from one form into another, e.g. converts data from one form usable with electronic equipment to another form useable over wireless or landline communication technologies. Such conversion devices include conventional modems that can be used with the public switched telephone network, cellular modems and other network interface devices. Preferably, the communication link 102 provides a high-bandwidth data communication link that achieves high transmission speeds and low latency. Further, the communications link 102 may utilize secure protocols, such as secure-Hypertext Transfer Protocol ("HTTP"), pretty good privacy ("PGP"), etc., to ensure that communications among the devices coupled with the link 102 are authorized, authentic and/or otherwise uncompromised.

Preferably, terminal 101 includes a memory, an interface, a processor, and operating firmware/software that perform functions, such as receiving input from a user, generating and transmitting instructions to contract generator 103 to generate a CDS futures contract and receiving a response to those instructions. Terminal 101 may be a conventional computer, a hybrid personal computer, a personal digital assistant (PDA), a laptop computer, a mobile telephone or any other device that can receive and send information through a communication link. Terminal 101 may also include a display device, a keyboard, a mouse, a touch panel, a graphical user interface (GUI), a printer, a scanner, and/or other input/output devices associated with a computer for interacting with a user of the terminal 101. In one embodiment, terminal 101 is a personal computer having a Pentium class processor, a suitable memory, hard disk and user interface and a network interface compatible with the communications link 102.

As shown in FIG. 5, terminal 101 is connected through the communication link 102 to the match engine 105. The communications link 102 also connects the match engine 105 to the contract generator 103. In the disclosed embodiments, the match engine 105 includes a matching system, i.e. a system capable of receiving bids and offers and otherwise managing the execution of trades in a marketplace, such as those provided by Chicago Mercantile Exchange Inc., (CME Group) located in Chicago, Ill. However, the embodiments disclosed herein are applicable to any trading or futures market in the United States or elsewhere in the world, for example, the Chicago Board of Trade (CBOT), the Bolsa de Mercadorias e Futoros in Brazil (BMF), the London International Financial Futures Exchange, the New York Mercantile Exchange (NYMEX), the Kansas City Board of Trade (KCBT), MATIF (in Paris, France), the London Metal Exchange (LME), the Tokyo International Financial Futures Exchange, the Tokyo Commodity Exchange for Industry (TOCOM), the Meff Renta Variable (in Spain), the Dubai Mercantile Exchange (DME), and the Intercontinental Exchange (ICE).

The match engine 105 matches orders, including resting orders and new orders, electronically according to one or more trade matching algorithms, such as a first-in-first-served algorithm, an allocation algorithm, or a market maker priority algorithm. An "order" can be a bid to purchase or an offer to sell. In one embodiment, the match engine 105 is implemented as a software program which executes on a computer system capable of executing the match engine 105 and interfacing with the communications link 102. Alternatively, the match engine 105 may be implemented as a combination of hardware and software.

Although the match engine 105 and the contract generator 103 are illustrated as separate devices that are capable of being run on one or more computers, in alternative embodiments these systems and methods can also be integrated within a single device. The match engine 105 is further capable of operating in an automatic, semi-automatic or manual fashion.

Figure 6:
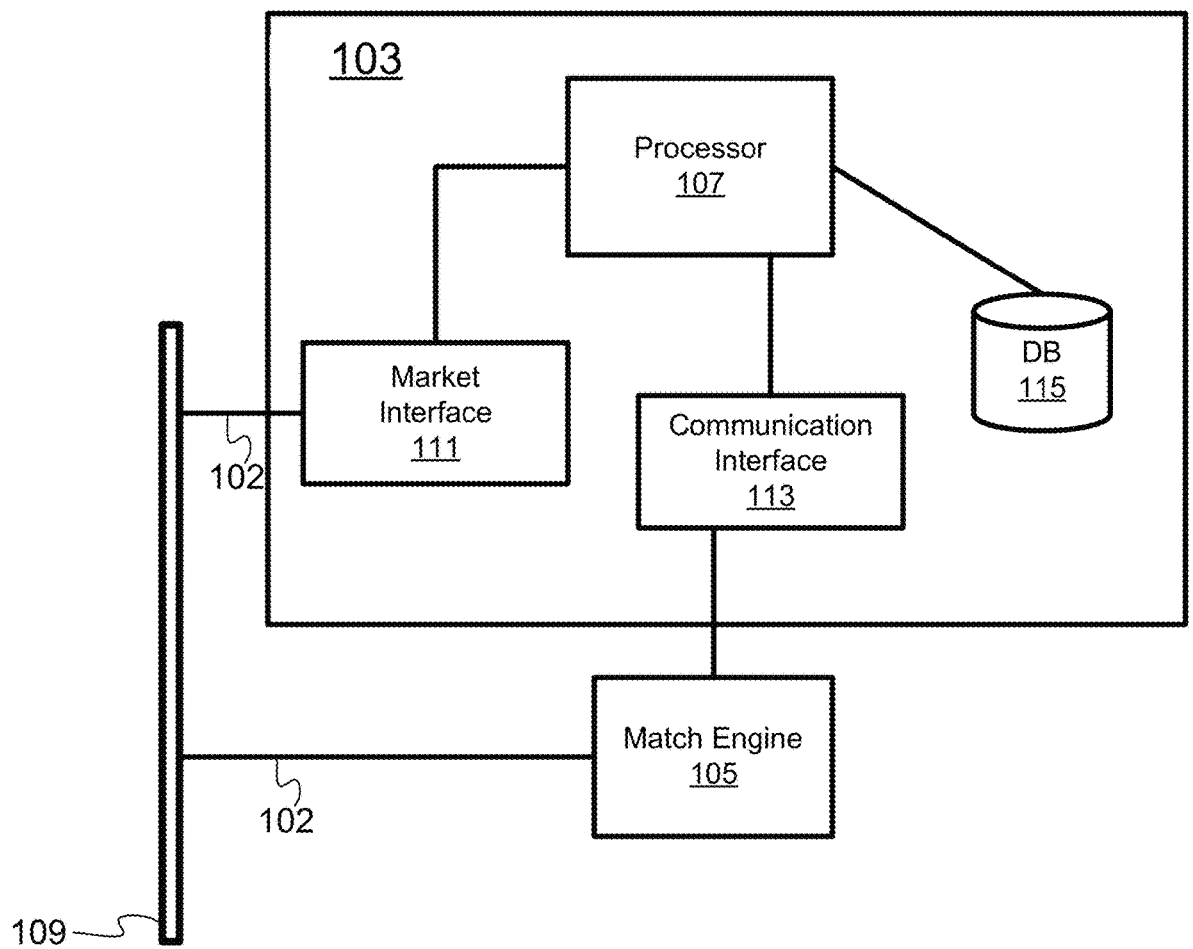
FIG. 6 illustrates a detailed view of a contract generator of the electronic trading system of FIG. 5.

FIG. 6 illustrates a detailed view of contract generator 103 of the electronic trading system of FIG. 3. Contract generator 103 includes a processor 107, a database 115, a market interface 111, and a communication interface 113.

Database 115 is a conventional storage system, such as a hard disk or memory. Database 115 stores data regarding the contracts available in the associated exchange/match engine. Database 115 may also include market data information, expert opinion and financial quotes.

Processor 107 may be any type of general purpose processor configured to define a credit default swap futures contract according to the first request and the second request using an initial price defined by a fraction of a notional value of the bond less the premium payment.

Market interface 111 includes the hardware and/or software components necessary to communicate with terminals 101 and communication link 102 and bus 109 to receive a first request, from a first market participant via one terminal 101, to provide a contingency payment triggered by the occurrence of a credit event of a reference entity and a second request, from a second market participant at another terminal 101, to provide a premium payment to the first market participant in exchange for the contingency payment triggered by the occurrence of the credit event.

Communication interface 113 includes the hardware and/or software components necessary for the contract generator 103 to communicate with match engine 105. The match engine 105 receives the definition of the CDS futures contract stored in database 115 through communication interface 113.

Figure 7:
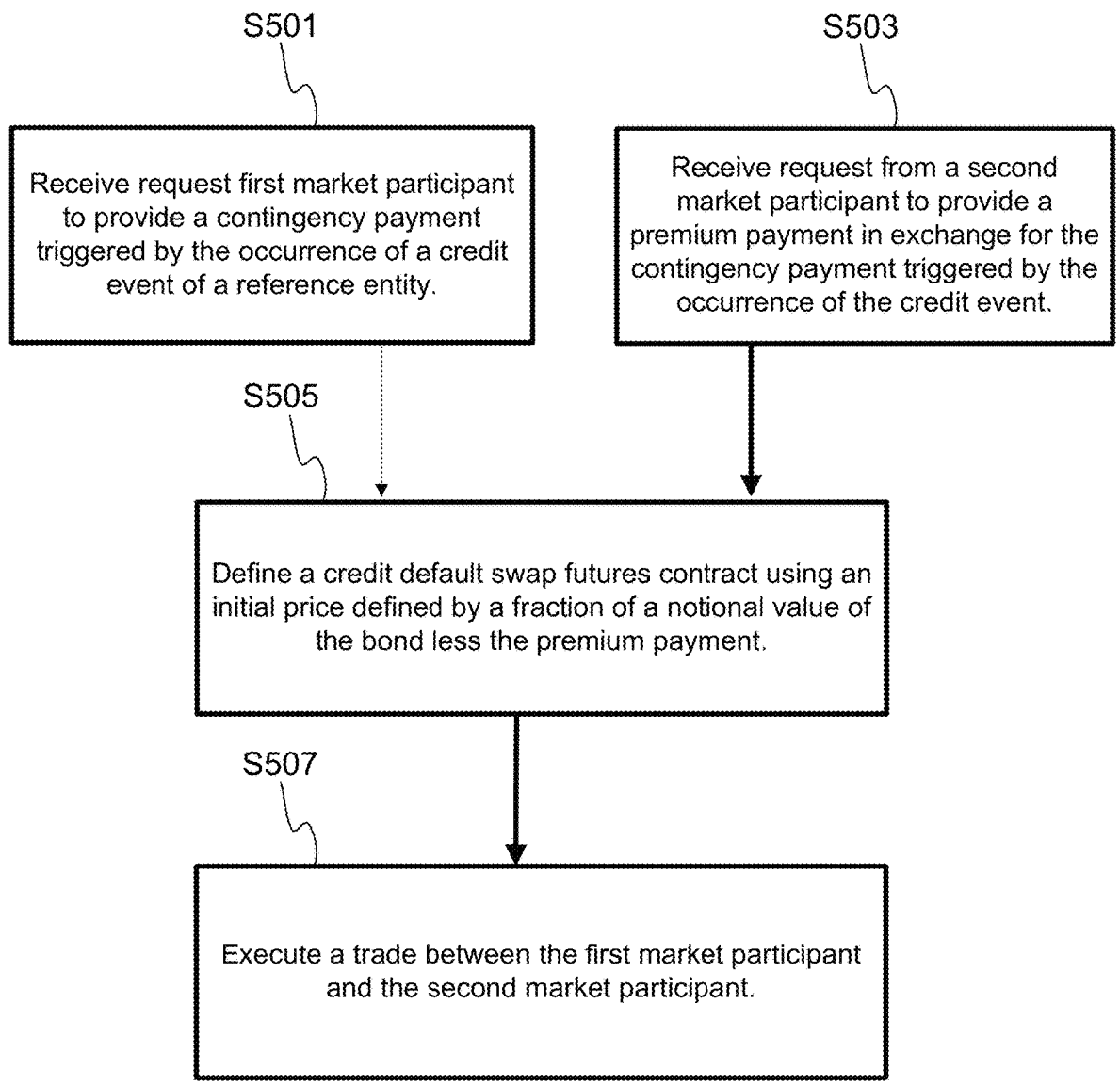
FIG. 7 illustrates an exemplary process for trading CDS futures contracts in an electronic trading system.

FIG. 7 illustrates an exemplary process for trading CDS futures contracts in an electronic trading system. At block 5501, a request is received from a first market participant to provide a contingency payment triggered by the occurrence of a credit event of a reference entity. At block 5503, a request is received from a second market participant to provide a premium payment in exchange for the contingency payment triggered by the occurrence of the credit event. The requests may be received in any order or simultaneously.

At block 5505, a credit default swap futures contract is defined using an initial price defined by a fraction of a notional value of the bond less the premium payment. For example, the price may be: 100—Cumulative Annual Premium. At block 5507, the match engine 105 executes a trade between the first market participant and the second market participant. Optionally, the electronic trading system may communicate or display the trade. The trade may be displayed on one or more terminals 101.

Figure 8:
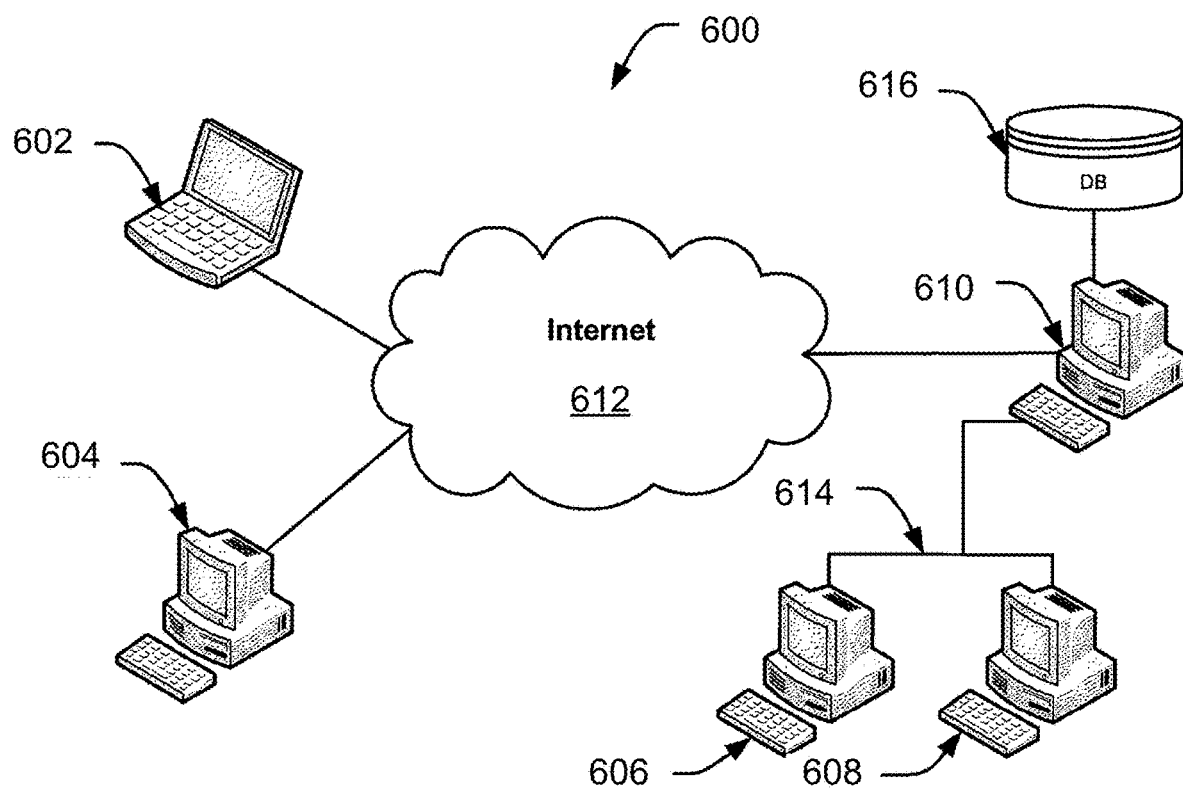
FIG. 8 illustrates one embodiment of the systems and devices for carrying out the process of FIG. 7.

FIG. 8 illustrates one embodiment of a system 600 configured to implement one or more of the disclosed trading methods, allocation algorithms, etc. The system 600 may include multiple terminals 602 to 608 directly and/or indirectly in communication with an order management terminal 610. For example, the terminals 602 and 604 may communicate with the order management terminal 610 via the Internet 612, a wide area network (WAN) and/or other communication networks. The terminals 606 and 608 may communicate with the order management terminal 610 via, for example, a communication network 614 such as an Ethernet network, a wireless fidelity (WiFi) and/or other communication networks. The order management terminal 610 may, in turn, be in communication with a database 616 or other memory or storage device or medium. The database 616 may be configured to store, in an accessible manner, the information, algorithms, parameters, etc. necessary to implement and monitor the trading methods, allocation algorithms disclosed herein. The database 616 may be a separate device or logical construct or may be a portion of the order management terminal 610.

Figure 9:
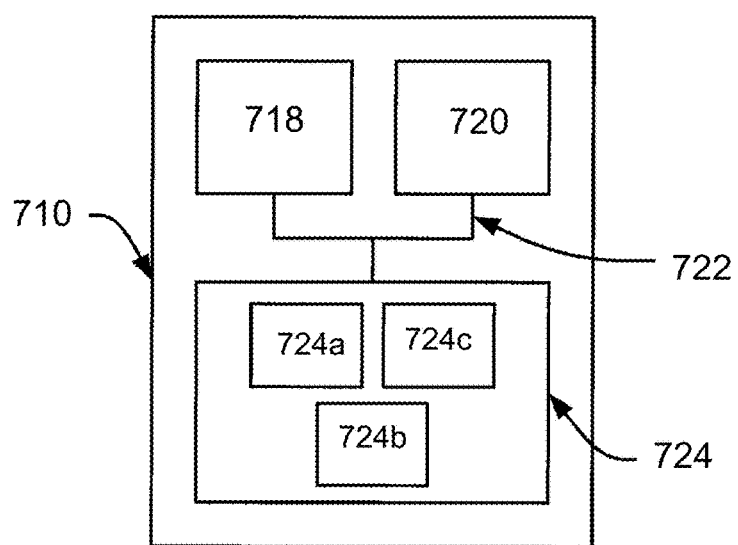
FIG. 9 illustrates an implementation of one of the devices in the system of FIG. 8 for carrying out the process of FIG. 7.

FIG. 9 illustrates one example of a logical configuration that may be implemented in the order management terminal 710. For example, the order management terminal 710 may include a communication module 718 and a memory 720 in communication with a processor 724 via a communication bus 722. The memory may include RAM, ROM, flash memory, or any other type of known storage medium. Moreover, the memory 720 may include the database 716 stored thereon. The communication module 718 may be a wireless communication module or may be a wired communication module.

The processor 724 may be a general purpose processor configured to execute the disclosed trading methods, allocation algorithms, and other methods disclosed herein. Alternatively, the processor 724 may represent one or more application specific processor or modules, 724*a*, 724*b*, and 724*c*. For example, the module 724*a* may be a FIFO allocation module or processor; the module 724*b* may be a pro-rata allocation module or processor; and the module 724*c* may be a tracking module or processor for processing and updating the order state associated with each method and/or algorithm.

The steps, elements and processes discussed herein may be encoded as program logic, computer readable code and/or instructions. These encoded elements, in turn, may be stored or embedded on a computer readable medium such as, for example, a hard disk drive, a solid state drive or other storage medium. The computer readable medium may be in communication with a processor which, in response to an appropriate input or command, may execute the program logic stored on the computer readable medium. The execution of this program logic may result in the execution of the step, elements and processes embodied and discussed herein.

It should be understood that various changes and modifications to the presently preferred embodiments described herein will be apparent to those skilled in the art. Such changes and modifications can be made without departing from the teachings of the present invention and without diminishing its intended advantages. It is therefore intended that such changes and modifications be covered by the appended claims.

I claim:

1. A system communicatively coupled with a hardware market interface that receives, via an electronic communications network, a first request from a first market participant terminal for a first market participant to provide a contingency payment upon occurrence of a credit event of a reference entity and a second request from a second market participant terminal for a second market participant to provide a premium payment to the first market participant in exchange for the contingency payment, wherein the first and second market participants are anonymous to one another, the system comprising:

a computer processor which, based on the first and second requests, defines a credit default swap futures contract characterized by an initial price less than a predefined final price, wherein the initial price is defined by a fraction of a notional value of a reference obligation less the premium payment, wherein the premium payment corresponds to a prevailing market rate of a plurality of payments over a duration of the credit default swap futures contract;

a clocking device, coupled with the computer processor, which determines a passage of time; and a communication interface that couples the computer processor with a match engine which is coupled with an exchange, the match engine, responsive to the definition of the credit default swap futures contract, operative to automatically execute a trade between the first market participant and the second market participant to provide the first market participant with a long position in the credit default swap futures contract in the amount of the initial price and provide the second market participant with a short position in the credit default swap futures contract in the amount of the initial price, and the exchange, responsive to the execution of the trade, operative to facilitate the premium payment to an electronic account of the first market participant and the contingency payment to an electronic account of the second market participant, without identifying either of the first and second market participants to the other of the first and second market participants, via periodic payment and collection of funds from the electronic accounts of the first and second market participants based on a value of the long and short positions held thereby as compared to the initial price of the credit default swap futures contract communicated to the exchange as a market price thereof and wherein the computer processor is further operative to linearly increase the initial price communicated to the exchange with the passage of time determined by the clocking device based on accruals of the funds paid and collected by the exchange, subsequent payment and collection of funds from the electronic accounts of the first and second market participants being based thereon, and return to the predefined final price at expiration of the credit default swap contract unless the credit event occurs before the expiration.

2. The system of claim 1, wherein the second request is received before the first request.

3. The system of claim 1, wherein the system is external to the match engine.

4. The system of claim 1, wherein the exchange pays and collects the funds daily.

5. The system of claim 1, wherein the difference between the initial price and the predefined final price is a fraction of a notional value of a reference obligation less the premium payment.

6. The system of claim 1, wherein the exchange collects the funds from the electronic account of the second market participant and pays the funds to the electronic account of the first market participant, the collected and paid funds comprising the premium payment.

7. The system of claim 1, wherein the linear increase of the initial price by the computer processor creates a financial loss for the second market participant triggering a mark to market mechanism of the exchange to collect funds therefrom in accordance with the loss, and creates a financial gain for the first market participant triggering the mark to market mechanism of the exchange to credit funds thereto in accordance with the gain.

8. The system of claim 1, wherein the match engine is operative to receive data indicative of whether the credit event has occurred.

9. The system of claim 1, wherein a clearinghouse assumes the counterparty risk of the credit default swap futures contract.

10. An apparatus communicatively coupled with an interface that receives, via an electronic communications network, a first request from a first market participant terminal for a first market participant to provide a contingency payment upon occurrence of a credit event of a reference entity and a second request from a second market participant terminal for a second market participant to provide a premium payment to the first market participant in exchange for the contingency payment, wherein the first and second market participants are anonymous to one another, the apparatus comprising:
   a processor which, based on the first and second requests, defines a credit default swap futures contract characterized by an initial price less than a predefined final price, wherein the initial price is defined by a fraction of a notional value of a reference obligation less the premium payment, wherein the premium payment corresponds to a prevailing market rate of a plurality of payments over a duration of the credit default swap futures contract;
   a clocking device, coupled with the processor, which determines a passage of time; and
   a communication interface that couples the processor with a match engine which is coupled with an exchange, the match engine, responsive to the definition of the credit default swap futures contract, operative to automatically execute a trade between the first market participant and the second market participant to provide the first market participant with a long position in the credit default swap futures contract in the amount of the initial price and provide the second market participant with a short position in the credit default swap futures contract in the amount of the initial price, and the exchange, responsive to the execution of the trade, operative to facilitate the premium payment to an electronic account of the first market participant and the contingency payment to an electronic account of the second market participant, without identifying either of the first and second market participants to the other of the first and second market participants, via periodic payment and collection of funds from the electronic accounts of the first and second market participants based on a value of the long and short positions held thereby as compared to the initial price of the credit default swap futures contract communicated to the exchange as a market price thereof and wherein the processor linearly increases the initial price communicated to the exchange with the passage of time determined by the clocking device based on accruals of the funds paid and collected by the exchange, subsequent payment and collection of funds from the electronic accounts of the first and second market participants being based thereon, and return to the predefined final price at expiration of the credit default swap contract unless the credit event occurs before the expiration.

11. The apparatus of claim 10, wherein the second request is received before the first request.

12. The apparatus of claim 10, wherein the apparatus is external to the match engine.

13. The apparatus of claim 10, wherein the exchange pays and collects the funds daily.

14. The apparatus of claim 10, wherein the difference between the initial price and the predefined final price is a fraction of a notional value of a reference obligation less the premium payment.

15. The apparatus of claim 10, wherein the exchange collects the funds from the electronic account of the second market participant and pays the funds to the electronic account of the first market participant, the collected and paid funds comprising the premium payment.

16. The apparatus of claim 10, wherein the linear increase of the initial price by the processor creates a financial loss for the second market participant triggering a mark to market mechanism of the exchange to collect funds therefrom in accordance with the loss, and creates a financial gain for the first market participant triggering the mark to market mechanism of the exchange to credit funds thereto in accordance with the gain.

17. The apparatus of claim 10, wherein the match engine is operative to receive data indicative of whether the credit event has occurred.

18. The apparatus of claim 10, wherein a clearinghouse assumes the counterparty risk of the credit default swap futures contract.

19. A computer implemented method for generating a contract based on receipt, via an electronic communications network, of a first request from a first market participant terminal for a first market participant to provide a contingency payment upon occurrence of a credit event of a reference entity and a second request from a second market participant terminal for a second market participant to provide a premium payment to the first market participant in exchange for the contingency payment, wherein the first and second market participants are anonymous to one another, the method comprising:
   defining, by a processor based on the first and second requests, a credit default swap futures contract characterized by an initial price less than a predefined final price, wherein the initial price is defined by a fraction of a notional value of a reference obligation less the premium payment, wherein the premium payment corresponds to a prevailing market rate of a plurality of payments over a duration of the credit default swap futures contract;
   determining, by a clocking device coupled with the processor, a passage of time; and
   communicating, via a communication interface that couples the processor with a match engine which is coupled with an exchange, credit default swap futures contract to the match engine which, responsive thereto, is operative to automatically execute a trade between the first market participant and the second market participant to provide the first market participant with a long position in the credit default swap futures contract in the amount of the initial price and provide the second market participant with a short position in the credit default swap futures contract in the amount of the initial price, and the exchange, responsive to the execution of the trade, is operative to facilitate the premium payment to an electronic account of the first market participant and the contingency payment to an electronic account of the second market participant, without identifying either of the first and second market participants to the other of the first and second market participants, via periodic payment and collection of funds from the electronic accounts of the first and second market participants based on a value of the long and short positions held thereby as compared to the initial price of the credit default swap futures contract communicated to the exchange as a market price thereof and wherein the processor linearly increases the initial price communicated to the exchange with the passage of time determined by the clocking device based on accruals of the funds paid and collected by the exchange, subsequent payment and collection of funds from the electronic accounts of the first and second market participants being based thereon, and return to the predefined final price at expiration of the credit default swap contract unless the credit event occurs before the expiration.

20. The computer implemented method of claim 19, wherein the second request is received before the first request.

21. The computer implemented method of claim 19, wherein the defining and determining occur external to the match engine.

22. The computer implemented method of claim 19, wherein the exchange pays and collects the funds daily.

23. The computer implemented method of claim 19, wherein the difference between the initial price and the predefined final price is a fraction of a notional value of a reference obligation less the premium payment.

24. The computer implemented method of claim 19, wherein the exchange collects the funds from the electronic account of the second market participant and pays the funds to the electronic account of the first market participant, the collected and paid funds comprising the premium payment.

25. The computer implemented method of claim 19, wherein the linear increase of the initial price by the processor creates a financial loss for the second market participant triggering a mark to market mechanism of the exchange to collect funds therefrom in accordance with the loss, and creates a financial gain for the first market participant triggering the mark to market mechanism of the exchange to credit funds thereto in accordance with the gain.

26. The computer implemented method of claim 19, further comprising receiving, by the match engine, data indicative of whether the credit event has occurred.

\* \* \* \* \*